United States Patent
Subrahmanyan et al.

(10) Patent No.: US 6,999,480 B2
(45) Date of Patent: Feb. 14, 2006

(54) METHOD AND APPARATUS FOR IMPROVING DATA INTEGRITY AND DESYNCHRONIZER RECOVERY TIME AFTER A LOSS OF SIGNAL

(75) Inventors: Ravi Subrahmanyan, Windham, NH (US); Anthony B. Candage, Andover, MA (US)

(73) Assignee: Applied Micro Circuits Corporation, Andover, MA (US)

( * ) Notice: Subject to any disclaimer, the term of this patent is extended or adjusted under 35 U.S.C. 154(b) by 834 days.

(21) Appl. No.: 09/994,460

(22) Filed: Nov. 26, 2001

(65) Prior Publication Data

US 2003/0099204 A1    May 29, 2003

(51) Int. Cl.
- *H04L 12/28* (2006.01)
- *H04L 25/64* (2006.01)
- *H04J 3/07* (2006.01)
- *H03L 7/06* (2006.01)

(52) U.S. Cl. ............. 370/907; 370/506; 370/516; 370/252; 327/155; 327/156; 375/214; 375/215; 375/325

(58) Field of Classification Search ............. 370/907, 370/506, 516, 252; 327/155, 156; 375/214, 375/215, 325
See application file for complete search history.

(56) References Cited

U.S. PATENT DOCUMENTS

| | | | | |
|---|---|---|---|---|
| 4,302,839 A | * | 11/1981 | Mueller | 370/506 |
| 5,235,332 A | * | 8/1993 | Stephenson, Jr. | 341/50 |
| 6,009,075 A | * | 12/1999 | Roberts et al. | 370/219 |

* cited by examiner

*Primary Examiner*—Huy D. Vu
*Assistant Examiner*—Lina Yang
(74) *Attorney, Agent, or Firm*—Weingarten, Schurgin, Gagnebin & Lebovici LLP

(57) ABSTRACT

An apparatus and corresponding method for preventing data loss in network devices is disclosed. The present invention monitors an incoming data stream to a network device, or devices, and in the event that an error condition is detected, predetermined error data is inserted into the data stream, wherein the predetermined error data is provided at the same data rate as the recovered data rate internal to the network device. Thus, the network device will not have to adjust to a different data rate and potentially lose data during the adjustment period.

32 Claims, 3 Drawing Sheets

METHOD AND APPARATUS FOR IMPROVING DATA INTEGRITY AND DESYNCHRONIZER RECOVERY TIME AFTER A LOSS OF SIGNAL

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

In a synchronous communications network, digital payload data is carried on a particular clock frequency within a synchronous message format. This payload data may include both asynchronous digital data and synchronous digital data originating at a different data rate in a foreign digital network. The Synchronous Optical Network (SONET) and its European counterpart the Synchronous Digital Hierarchy (SDH) provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements.

One of the benefits of SONET is that it can carry large payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

If the digital data that is mapped and framed in the STS-N/STM-N message was originally carried by a clock signal having a different frequency than the SONET/SDH line rate clock, certain adjustments to the framed digital data must be made. For example, if a DS-3 data signal, which is carried by a 44.736 MHz DS-3 clock signal is to be carried in a SONET/SDH fiber-optic network, the DS-3 signal is mapped into the higher rate SPE of an STS-1 message, and extra bytes must be added to the DS-3 signal prior to transmission through the SONET/SDH network. These extra bits are commonly referred to as stuff bits or gap bits and are merely place markers and in general carry no valid data. These gap bits are required because the DS-3 signal is slower than the SONET/SDH clock frequency so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristic Synchronous Digital Hierarchy (SDH) Equipment Functional Blocks", January 1994.

When the STS-1 message is received at a network exit node, the overhead bytes are removed from the SONET STS-1 message and replaced by gaps in the data stream. The payload data that remains is de-framed and de-mapped into a data stream carried by a higher clock frequency than the nominal original clock frequency of the payload data. Thus the stuff data that was inserted when the data was mapped into the SPE remains when the data stream is recovered from the SPE and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations. Data is read from the elastic store buffer at a different clock frequency and is provided as output data at that frequency. This output data does not contain the gap data bits that were added when the slower signal was mapped into the faster SONET/SDH STS-1 message.

Once the data has been de-mapped and de-framed from the SPE a phase locked loop (PLL) is typically used to recover the clock information and to adjust the read signal associated with the data stored in the elastic store for transmission downstream as a data signal carried by a smooth clock signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz., but is less effective at filtering out the low frequency wander components. Since, typically the wander components are much less than 10 Hz. these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

During the transmission of a SONET/SDH message an error may occur resulting in a loss of data. This loss of data may be caused by a loss of the data signal, a loss of the clock signal, a loss of frame, or another error condition may occur. These errors may occur to one or more, or all, of the transported digital signals that have been multiplexed into the SONET/SDH message. In some of these error conditions, an Alarm Indicator Signal (AIS) is generated and certain predetermined bits in the overhead bytes are set. In addition, a predetermined characteristic data signal is provided, by the receiver, in the SONET message payload in lieu of the error data generated by the various pieces of equipment in the absence of a legitimate signal. If the loss of signal were to the entire SONET/SDH message, caused for example by a severed optical fiber, then the predetermined characteristic data signal would be used in lieu of the entire message payload. Typically the characteristic error data signal is a sequence composed entirely of ones, i.e., "1, 1, 1, 1, 1 . . . ."

The predetermined characteristic data signal is provided at an error condition data rate that is within the SONET/SDH specification. However, it is unlikely that the error condition data rate is equivalent to the payload data rate prior to the loss of signal condition occurring. As discussed above, when a PLL that has previously phase locked to an input signal receives the input signal at a new data rate, the PLL must reestablish phase lock at the new input data rate before the output data will be valid. Accordingly, because the characteristic error data signal is at a different data rate than the payload data, the PLL may lose phase lock and have to reacquire phase lock before the output data will be valid. Similarly, when the payload data is restored, the PLL may once again lose phase lock on the characteristic error data rate when the payload data is restored. The time it takes the PLL to reacquire phase lock will result in erroneous data being sent, and a loss of data after restoration of the payload data.

Thus, it would be advantageous to provide a desynchronizer and PLL that provides for less data loss and a quicker capture of data after a loss of signal occurs and upon restoration of the payload data.

BRIEF SUMMARY OF THE INVENTION

An apparatus and corresponding method for preventing data loss in network devices is disclosed. The present invention monitors an incoming data stream to a network device, or devices, and in the event that an error condition is detected, predetermined error data is inserted into the data stream, wherein the predetermined error data is provided at the same data rate as the recovered data rate internal to the network device. Thus, the network device will not have to adjust to a different data rate and potentially lose data during the adjustment period.

The present apparatus for preventing data loss in a network device, in the event that an error condition occurs, includes the network device having a framer, a pointer interpreter, a demapper and a PLL that is configured and arranged to provide a control word signal that is indicative of the PLL recovered data rate. The network device receives at least one network data connection providing data thereto, wherein the data stream carried on the network data connection includes a plurality of data messages transmitted in a first message format, and wherein a portion of the first format includes a portion providing indicia of an error condition. The framer, pointer interpreter, demapper and PLL process data in a known manner.

The apparatus also includes a monitor for monitoring the incoming data stream for an error condition such as a loss of signal, loss of clock, a loss of frame error, or by detecting an existing AIS condition by detecting an error condition in the portion of the plurality of data messages that provides indicia of an error condition. The monitor is configured and arranged such that, in the event an error condition is detected, the monitor provides an output error signal. The present invention also includes a protection device that includes an error data generator and an error data rate generator. The protection device data rate generator is coupled to the network device PLL and receives the control word from the network device PLL and is responsive to the control word by providing a data carrier signal such that the data rate of data carried on the signal is substantially equal to the PLL recovered data rate. The error data generator is coupled to the monitor and is responsive to the error signal by generating a plurality of predetermined error data, wherein the error data rate generator is coupled to the error data generator and in conjunction therewith provide the plurality of predetermined error data at substantially the PLL recovered data rate. The plurality of predetermined error data is provided to the pointer interpreter whereupon the pointer interpreter inserts the plurality of predetermined error data at the appropriate locations in the data stream.

In another embodiment, an apparatus for preventing data loss among a plurality of network devices is disclosed. In this embodiment each of the plurality of network devices includes a framer, a pointer interpreter, a demapper, and a phase locked loop (PLL). Each of the plurality of PLLs includes a control word signal that is indicative of the PLL recovered data rate of the corresponding PLL. Each of the plurality of network devices receives, as an input, at least one of a plurality of network data connections, wherein each of the plurality of network data connections carries a data stream that includes a plurality of data messages. Each of the plurality of data messages is in a first format and a portion of the first format is used to provide indicia of an error condition.

This embodiment includes a first switching module coupled to the plurality of network data connections. The first switching module monitors the incoming data stream for an error condition such as a loss of signal, loss of clock, a loss of frame error, or an existing AIS condition by detecting an error condition in the portions of the data messages that are used to provide indicia of an error condition. In the event that an error condition is detected, the first switching module identifies the network data connection that has the error condition. The first switch device also switches the identified network connection to a protection device, and provides an error signal.

A control word module is coupled to the first switching module and to the PLL of each of the plurality of network devices. The control word module monitors the control word provided by the PLL associated with each network device. The control word module is also coupled to the first switching module and receives the error signal therefrom. The control word module is responsive to the error signal from the first switching module by identifying which of the plurality of network devices is receiving the corrupted data from the network data connection identified with the error condition.

The protection device can include a framer, a pointer interpreter, a mapper, and a PLL and an error data generator and an error data rate generator. The error data generator, which operates as the oscillator for the protection device PLL, is coupled to the control word module such that, the error data rate generator receives the control word therefrom. The error data generator is responsive to the control word by providing a carrier signal having a data rate substantially equal to the recovered PLL data rate of the network device corresponding to the control word. The data generator is coupled to the first switching module and is responsive to the error signal by generating predetermined data that is indicative of a currently occurring error condition. The data generator, in conjunction with the error data rate generator, provides a plurality of predetermined error data at the recovered PLL data rate. The protection device receives the data stream from the switched data network connection and the protection device framer and pointer interpreter operate as in a normal network device, and the protection device PLL operates off the error data rate generator. The plurality of predetermined error data is provided to the protection device pointer interpreter to be inserted into the data stream at the appropriate locations. Because the protection device PLL is operated in conjunction with the error data rate generator the protection device will operate substantially at the PLL recovered data rate of the corresponding network device and thus data loss will be minimized since the protection device PLL does not have to acquire phase lock on the incoming signal.

Other forms, features and aspects of the above-described methods and system are described in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
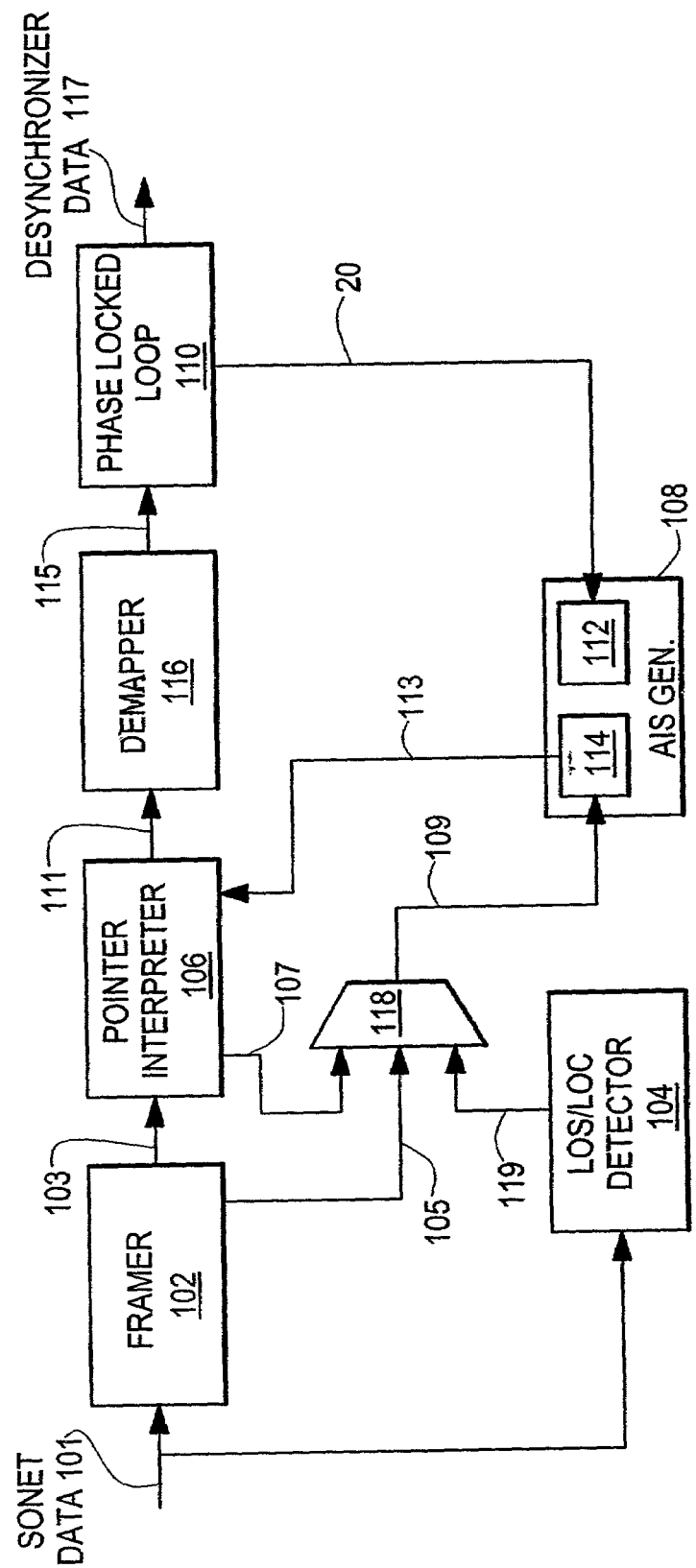
FIG. 1 is a block diagram of a portion of a SONET/SDH desynchronizer employing the present invention.
Figure 2:
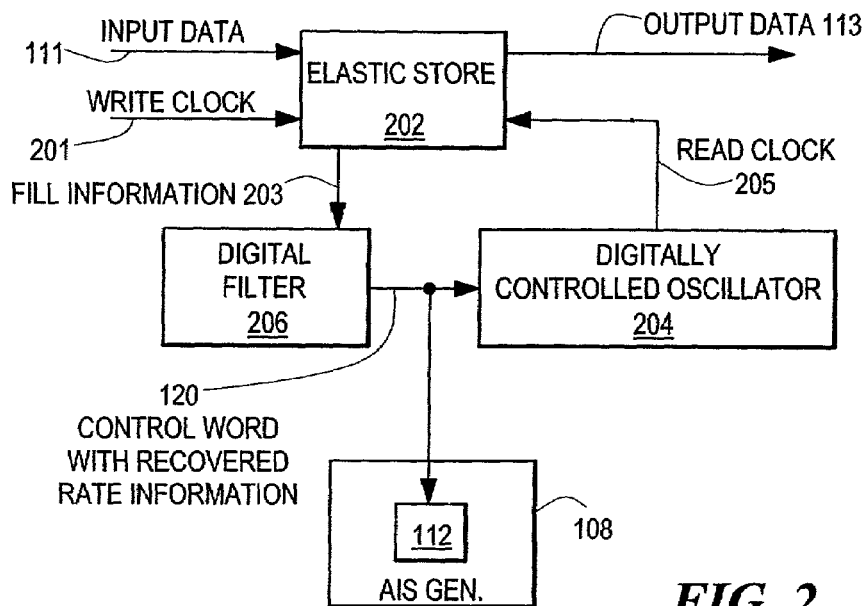
FIG. 2 is a more detailed block diagram of one embodiment of the phase locked loop of FIG. 1.
Figure 3:
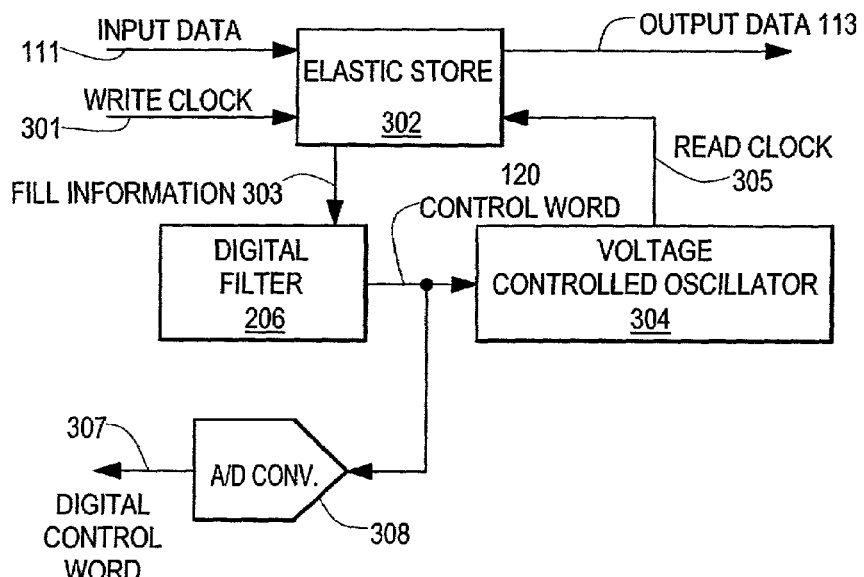
FIG. 3 is a more detailed block diagram of another embodiment of the phase locked loop of FIG. 1.

FIGS. 1–3 depict an embodiment of the present apparatus and a corresponding method for preventing data loss in network devices receiving a data stream of messages from a data network connection. The embodiments depicted herein monitors an incoming data stream to a network device or devices for an error condition that can include a loss of signal, loss of clock, a loss of frame error, or an existing AIS condition by detecting an error condition in the portions of the data messages that are used to provide indicia of an error condition. In the event an error condition is detected or an alarm indication signal (AIS) is received predetermined error data is generated and inserted into the data stream. The predetermined error data is provided at the same data rate as the valid output data provided by the network device. In this way, the network device will not have to adjust to a different data rate.

Figure 4:
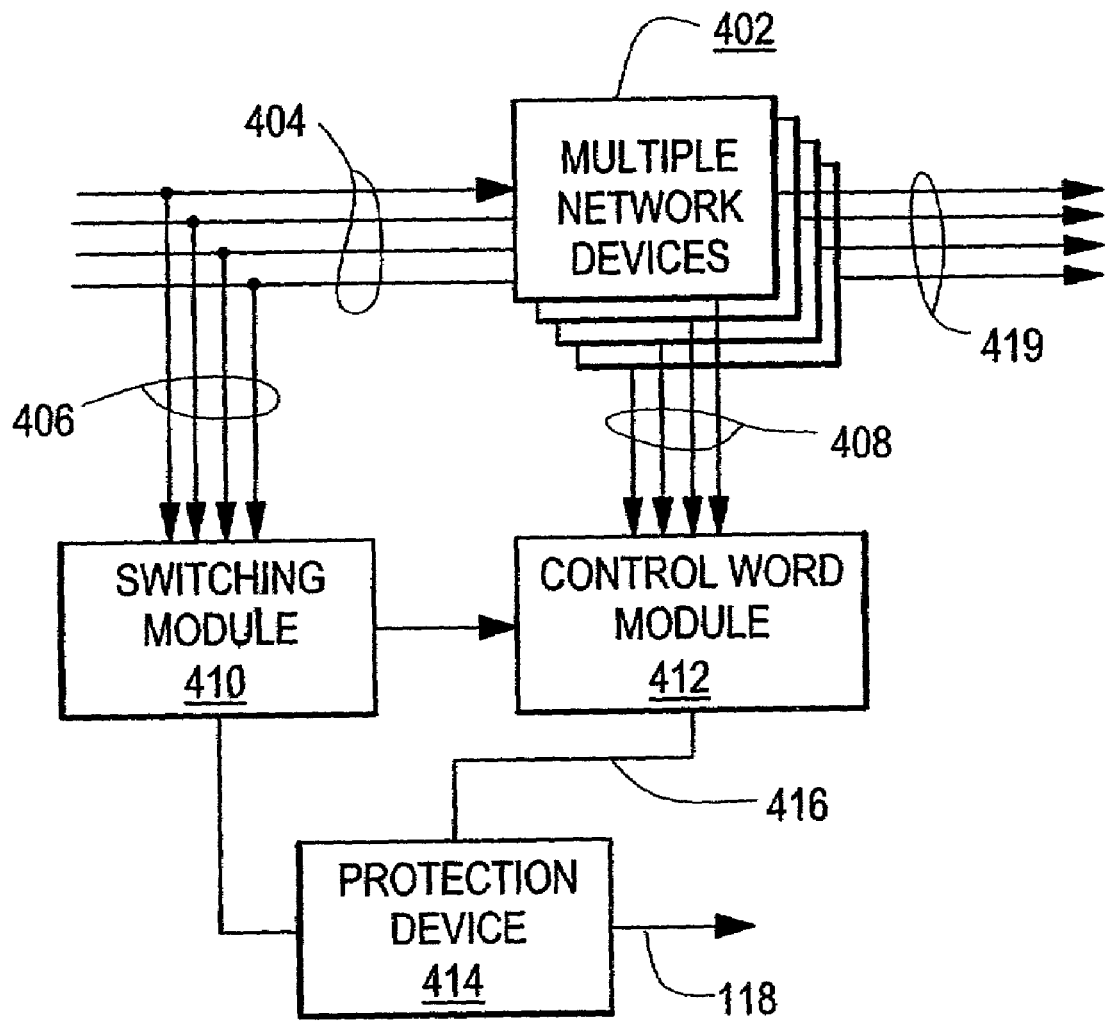
FIG. 4 is a block diagram of another embodiment of a protection device employing the present invention.

In particular, as shown in FIG. 1, the present apparatus and corresponding methods include providing feedback in the form of the PLL recovered data rate from the network device PLL to an AIS error data generator. FIG. 2 is a more detailed block diagram illustrating an implementation using a digital phase locked loop (PLL) in the network device, and FIG. 3 illustrates implementation using an analog PLL in the network device. FIG. 4 depicts another embodiment of the network protection system described herein in which a plurality of network devices, each of which receives a data stream via at least one data network connection, are protected from data loss by a network protection device. In the description of the embodiments that follow, SONET/SDH networks, network devices and desynchronizers are used for exemplary purposes only, and the apparatus and methods described herein may be used with other synchronous networks as well.

FIG. 1 depicts a portion of a SONET/SDH receiver that includes a framer 102, a pointer interpreter 106, a demapper 116 and a phase locked loop (PLL) 110. SONET data 101 is received from a network data connection (not shown) by framer 102 and an LOS detector 104. The framer 102 removes the overhead bytes from the SONET/SDH messages and provides gapped data 103 at a first data rate to the pointer interpreter 106. The pointer interpreter 106 utilizes the pointer information provided within the SONET message overhead bytes to provide gapped data 111 at a second data rate to a demapper 116 that removes the PDH data from the SONET payload, and provides this gapped PDH payload to the PLL 110. The PLL 110 receives the gapped data 115 at a PLL recovered data rate and provides, as an output, ungapped desynchronized data 113.

As discussed above, the apparatus and methods described herein monitor the incoming data signal for a variety of errors that can occur and result in the loss of data. The LOS/LOC detector 104 monitors the incoming data from the network connection and is configured and arranged to detect a loss of signal, a loss of clock signal, or both. The LOS/LOC detector provides an output 103 that is indicative of a loss of signal or a loss of clock signal in the SONET data 101. The framer 102 is configured and arranged to monitor the framing bits contained in the overhead bits in the SONET data 101, to detect the occurrence of a frame error, and in the event a frame error is detected, to provide an output signal 105 that is indicative of a loss of frame condition in the received SONET data 101. The pointer interpreter 106 is configured and arranged to monitor certain predetermined bits in the SONET data overhead bytes that provide indicia that an alarm indication signal (AIS) condition exists, and in the event that an AIS signal is detected, the pointer interpreter 106 provides an output signal 107 that is indicative of a received AIS signal. Each of the output signals 103, 105, and 107 that are indicative of an error condition being detected is provided to a multiplexer 118 that provides an error condition signal 109 that is indicative that an error event has occurred to the protection device/AIS generator 108, and in particular to an AIS data generator 114 contained therein. The protection device/AIS generator 108 is further coupled to the PLL 110 and receives PLL recovered data rate information therefrom. In particular the PLL 110 provides a control word to the AIS error data rate generator 112 that is indicative of the phase locked recovered data rate. Advantageously this allows the present apparatus to detect an error condition that occurs in the data link just preceding the present apparatus and to detect an existing error condition from upstream SONET equipment as well. In general in the embodiments described herein, the control word will not be the most recent control word generated by the PLL 110. Rather, because the errors that have occurred may have corrupted the most recent control word, a control word previously stored in memory will be used to set the rate of the AIS data generator 112.

In response to the error indication signal 109 the error data generator sets certain bits in the overhead bytes of the SONET data stream and provides a plurality of predetermined AIS error data. The AIS data rate generator 112 using the previously stored control word provided by PLL 110, via line 120, establishes a carrier signal that provides an error data rate that is substantially equivalent to the current PLL recovered data rate. The AIS data generator 114 and the AIS data rate generator 112 in conjunction will provide the plurality of predetermined AIS data carried on the carrier provided by the error data rate generator signal 113 such that the data rate of the plurality of predetermined AIS data is substantially equal to the PLL recovered data rate. The plurality of the predetermined AIS data is provided via line 113 to the pointer interpreter 106 that inserts this data into the data stream provided to the PLL 110 in the appropriate data locations. The line 113 as depicted in FIG. 1 provides AIS data to the pointer interpreter 106, however, depending on the configuration of the AIS generator, the AIS data may be provided to other modules. For example, if the AIS generator includes a mapper (not shown), a pointer generator (not shown), and a frame generator (not shown) the data line 113 would provide the AIS data to the framer 102. Similarly, the raw AIS data can be provided without formatting to the mapper 116 for direct substitution into the appropriate data locations in the data stream.

As discussed above, the error signal 109 may indicate that an error has occurred on a single input SONET signal, that an error has occurred on more than one input SONET signal, or that an error condition has occurred over the entire SONET connection. In the event that an AIS signal has been detected by the pointer interpreter 106, data contained within the overhead bytes of the SONET/SDH message includes information as to which one or more of the input lines and which data within each input line have been disrupted and have error conditions contained thereon. The pointer interpreter 106 uses this information to insert the predetermined characteristic AIS data sequence into the appropriate data slots in the SONET/SDH message. Advantageously this provides the predetermined characteristic AIS data sequence at substantially the same PLL recovered data rate that the PLL 110 is phase locked to, prior to the error signal being received. Accordingly the PLL 110 will not lose phase lock with the input signal thus losing data during the time that the PLL 110 has to reacquire phase lock. In addition, the PLL 110 will not have to reacquire lock on the incoming data signal when the error condition has ceased to exist and the AIS error data is no longer being generated at a different data rate. Thus data loss is minimized and data integrity is maximized during and after an AIS signal is received.

Alternatively, in the event that the entire signal is lost, or the clock is lost, the LOS/LOC detector 104 could switch the entire SONET data stream to the AIS generator. In this embodiment the protection device/AIS generator 108 would further include an AIS generator frame generator (not shown) and an AIS generator pointer generator (not shown), an AIS generator mapper (not shown), and an AIS generator PLL (not shown). The error data rate generator 112 receives the control word from the network device PLL, via line 120, such that in this embodiment, the AIS generator PLL will be running at the same rate as the PLL recovered data rate and will not lose data as it acquires phase lock. As discussed above, in general the control word provided via line 120 is a previously stored control word. The AIS generator data generator will therefore provide a framed data message that will be coupled to the framer 102 and will provide the necessary error data. As the AIS generator framer and AIS generator pointer interpreter begin to send data, the AIS generator PLL will begin to use its own control word and feedback system to maintain phase lock on the incoming data. In this embodiment, the output of the protection device/AIS generator 108 will be the desynchronized data with the appropriate error data inserted therein.

FIG. 2 depicts one embodiment of a digital implementation of the PLL 110 depicted in FIG. 1. In particular the digital PLL and associated components include an elastic store 202 that is receiving input data 111 and is clocked into the elastic store 202 by write clock line 201. The elastic store provides a fill information data 203 to a digital filter 206. The digital filter 206 provides a previously stored control word via line 120 containing recovered rate information to a digitally controlled oscillator 204. The digitally controlled oscillator adjusts the read clock signal 205 such that the elastic store 202 is maintained at a predetermined fill level on average relative to variations in the input rate. The digital filter can be a single pole or multi-pole with zeros that is designed according to well known design criteria and using well known stability criteria. Typically the digital filter is a low pass filter that may have a single or multiple poles and may have one or more zeros in the transfer function such that certain frequencies are passed and certain high frequency variations are removed from the input data rate. The fill level will vary depending on the frequency and number of the gaps in the input data, and the previously stored control word is generated to adjust the data rate generator 204. The digital filter 206 is configured and arranged to decrease the data rate in response to the fill level decreasing and to increase the data rate in response to the fill level increasing. In one embodiment the predetermined fill level is approximately a 50% fill level on average over time.

Referring again to FIG. 1, the PLL 110 provides the previously stored control word via line 120 to the AIS data rate generator 112 contained within the protection device/AIS generator 108. The AIS data rate generator 112 can be a digitally controlled oscillator (DCO) having input and output characteristics, i.e., for a given input the digital oscillator provides the same frequency as the PLL digitally controlled oscillator 204. Alternatively, the AIS data rate generator can be a voltage controlled analog oscillator (VCO) such as a voltage controlled crystal oscillator (VCXO). A digital to analog converter (DAC) would be used to convert the digital previously stored control word to an analog voltage suitable for use with the VCO. In this embodiment the DAC output would need to have an appropriate level of granularity to provide the necessary control of the VCO, VCXO. Similarly, the AIS data rate generator 112 can be a DAC in combination with a VCO or VCXO configured and arranged to provide the proper data rate to the AIS data generator 110.

FIG. 3 depicts another embodiment of the phase lock loop 110 in which an analog phase lock loop is used. The phase lock loop includes elastic store 302 that receives input data 111 that is clocked in via write clock 301. The elastic store 302 provides fill information 303 to an analog loop filter 306 that provides a control voltage to a VCXO 304. The voltage control crystal oscillator 304 provides a read signal 305 such that the output data 113 is read out of the elastic store at a rate which maintains the elastic store at a predetermined fill level on average. In one embodiment the predetermined fill level is approximately 50%. The control voltage 109 is further provided to an analog to digital converter 308 which is used to generate a digital control word 307 that is provided to the AIS data rate generator 112 contained within the protection device/AIS generator 108. In particular, the AIS data rate generator is a digitally controlled oscillator having an input/output characteristic, i.e., for a given control voltage the AIS data rate generator 112 would process the digital control word to provide a data rate that is substantially equal to the data rate provided by the voltage controlled crystal oscillator 304. In this way, during and after an error event occurs a minimum amount of data may be lost and data integrity may be maintained. Alternatively, the VCXO 304 can be a digitally controlled oscillator (DCO) in conjunction with an analog to digital converter (ADC). The ADC would be coupled to the analog loop filter and would receive the control voltage and convert the control voltage to an output of predetermined number of bits. The DCO would receive the output bits of the ADC and provide an appropriate oscillator output. The number of bits would be selected to provide a sufficient input range and granularity to the DCO to cover the expected range of frequencies. Similarly, the AIS data rate generator can be an analog VCO or VCXO operating directly from the control voltage 109 without the ADC 308.

FIG. 4 depicts another embodiment of the apparatus to prevent data loss from one or more network devices in the event of an error event occurring. The apparatus 400 includes a plurality of SONET/SDH network devices 402, each of which receives at least one of a plurality of SONET input lines 404 and provides desynchronized output data on one or more of the plurality of output lines 419. The apparatus further includes an AIS protection device 414 that includes an AIS error data generator (not shown) and an AIS data rate generator (not shown). As discussed above, the AIS data rate generator is typically a DCO, VCO, or a VCXO. In one embodiment, the protection device 414 provides, on output line 418, the AIS error data at an AIS data rate that is set by the internal AIS data rate generator. Typically when no AIS condition has been detected, the protection device will have the internal AIS data rate generator running at a default data rate.

A switching module 410 monitors the various AIS signals or other error channels of the SONET/SDH messages received from each of the plurality of incoming SONET lines 404. In the event that an AIS condition or other failure is detected in a received SONET/SDH message, the switching device 410 identifies the SONET/SDH input line on which the error is occurring and provides an error signal to a control word switching module 412. The control word switching module 412, identifies which of the plurality of the SONET/SDH network devices 402 corresponds to the identified SONET/SDH input line and is receiving the coupled data and provides the previously stored control word corresponding from the identified SONET/SDH network device PLL to the protection device 414. The protection device 414 receives the previously stored control word and provides the previously stored control word to the AIS data rate generator. After the control word switching module 412 has provided the previously stored control word from the identified SONET/SDH network device to the protection device 414, the switching module 410 provides the identified SONET/SDH input line to the error to the protection device 414. In this way, the AIS data rate generator in protection device 414 can be running at the appropriate data rate. As discussed above, this prevents the loss of other data as the data rate generator, or PLL, acquires and locks onto the correct data rate.

In the embodiment depicted in FIG. 4, the entire SONET/SDH input line that has the AIS error is switched to the AIS protection device 414. In this embodiment, the AIS protection device 414 further includes an AIS protection device framer (not shown), an AIS protection device pointer interpreter (not shown), and an AIS protection device PLL (not shown). Once the AIS data rate generator in the protection device 414 is running at the input data rate of the identified SONET/SDH line AIS data will be provided to the AIS protection device pointer interpreter and appropriately inserted into the identified SONET/SDH data stream thereby. The resultant output is provided on output 418 of the protection device 414.

Alternatively, the AIS data can be carried on the signal provided by the AIS data rate generator and can be returned to the pointer interpreter of the SONET/SDH network device. The AIS data can be returned via the control word switching module 412 or another switching module.

In another alternative embodiment, an external controller can be configured and arranged to monitor the incoming SONET/SDH input lines. In this embodiment, in the event an AIS event is detected, a signal can be provided from the controller to the control word switching module 414 and the switching device 410 to switch the input SONET line and the previously stored control word at the appropriate times.

Those of ordinary skill in the art should further appreciate that variations to and modification of the above-described methods and apparatus for maintaining the data integrity of a SONET/SDH receiver during and after an Error event occurs can be made. Accordingly, the invention should be viewed as limited solely by the scope and spirit of the appended claims.

What is claimed is:

1. An apparatus for preventing data loss in a network device receiving at least one network data connection, the network device including a framer, a pointer interpreter, a demapper, and a phase locked loop (PLL), the PLL providing a PLL control word indicative of the PLL recovered data rate of the PLL, the network data connection carrying a plurality of data messages having a first format, the first format including a portion of the data providing indicia of the existence of an error condition, the plurality of data messages having an input data rate, the apparatus comprising:

a monitor for detecting an error condition, the monitor configured and arranged such that in the event an error condition is detected, the monitor is responsive to the detected error condition by providing an error signal as an output;

a protection device including an error data generator and an error data rate generator, the error data rate generator coupled to the PLL, the error data rate generator configured and arranged to receive the PLL control word, the error data rate generator responsive to the PLL control word by providing a carrier signal for a data rate substantially equal to the PLL recovered data rate, the error data generator coupled to the monitor and being responsive to the error signal by generating a plurality of predetermined error data, wherein the error data rate generator is coupled to the error data generator and in conjunction therewith provide as an output, the plurality of predetermined error data at the PLL recovered data rate; and the plurality of predetermined error data provided to the network device wherein the network device inserts the plurality of predetermined error data into the plurality of data messages at the appropriate locations.

2. The apparatus of claim 1 wherein the monitor is configured and arranged to detect an alarm indicator signal in a SONET/SDH message.

3. The apparatus of claim 1 wherein the error data rate generator is a phase locked loop.

4. The apparatus of claim 1 wherein the error data rate generator is an analog oscillator.

5. The apparatus of claim 1 wherein the PLL data rate signal is a digital control word in a digital format.

6. The apparatus of claim 5 wherein the error data rate generator is a digital oscillator responsive to the digital control word and providing an error data rate substantially equal to the input data rate indicated by the digital control word.

7. The apparatus of claim 1 wherein the error condition detected by the monitor is a loss of signal error.

8. The apparatus of claim 1 wherein the error condition detected by the monitor is a loss of clock signal error.

9. The apparatus of claim 1 wherein the error condition detected by the monitor is a loss of frame signal error.

10. The apparatus of claim 1 wherein the error condition detected by the monitor are the portion of the data providing indicia of the existence of an error condition.

11. The apparatus of claim 10 wherein the portion of the data providing indicia of the existence of an error condition indicates an AIS error has occurred upstream in the data network.

12. The apparatus of claim 1 wherein the PLL control word is a previously stored PLL control word.

13. An apparatus for preventing data loss among a plurality of network devices, each of the plurality of network devices including a framer, a pointer interpreter, a demapper, and a phase locked loop (PLL), each of the plurality of network devices receiving at least one of a plurality of network data connections, each of the plurality of network data connections carrying a plurality of data messages each of the plurality of data messages being in a first format and having a portion of data providing indicia of an error occurring, each framer receiving the plurality of data messages and providing gapped data to the pointer interpreter that provides gapped data to the demapper that removes the incoming data from each of the plurality of data messages, the demapper providing demapped gapped data to the PLL that provides an output of ungapped data, each PLL further providing a control word indicative of the PLL recovered data rate, the apparatus comprising:
- a first switching nodule coupled to the plurality of network data connections, the first switching module monitoring the data messages and detecting an error condition, the first switching module providing indicia of the error condition, the first switching module configured and arranged to provide an error signal in the event that the monitored predetermined parts of a data message indicates an error has occurred;
- a control word module coupled to the phase locked loop of each of the plurality of network devices to monitor a control word providing indicia of the input data rate of the plurality of data messages received by the corresponding network device and the control word module further coupled to the first switching module and the control word module configured and arranged to provide as an output the control word of one of the plurality of network devices identified as receiving a network data connection identified as having an error condition;
- a protection device including an error data generator and an error data rate generator, the error data rate generator coupled to the control word module, the error data rate generator configured and arranged to receive the control word and to provide a data carrier signal to provide a data rate substantially equal to the PLL recovered data rate of the corresponding network device, the error data generator coupled to the switching module and being responsive to the error signal by generating error data, wherein the error data generator in conjunction with the error data rate generator provide as an output, the plurality of predetermined error data at substantially the PLL recovered data rate;
- the plurality of predetermined error data at substantially the PLL recovered data rate provided to the network device to be appropriately inserted into the plurality of data messages on the identified data network connection.

14. The apparatus of claim 13 wherein the error condition detected by the first switching module is a loss of signal error.

15. The apparatus of claim 13 wherein the error condition detected by the first switching module is a loss of clock signal error.

16. The apparatus of claim 13 wherein the error condition detected by the first switching module is a loss of frame signal error.

17. The apparatus of claim 13 wherein the error condition detected by the first switching module are the portion of the data providing indicia of the existence of an error condition.

18. The apparatus of claim 17 wherein the portion of the data providing indicia of the existence of an error condition indicates an AIS error has occurred upstream in the data network.

19. The apparatus of claim 13 wherein the control word is a previously stored control word.

20. An apparatus for preventing data loss among a plurality of network devices, each of the plurality of network devices including a framer, a pointer interpreter, and a phase locked loop (PLL), each of the plurality of network devices receiving at least one of a plurality of network data connections, each of the plurality of network data connections carrying a plurality of data messages each of the plurality of data messages being in a first format and having a portion of data providing indicia of an error occurring, each framer receiving the plurality of data messages and providing gapped data to the pointer interpreter that provides gapped data to the PLL that provides an output of ungapped data, each PLL further providing a control word indicative of the PLL recovered data rate, the apparatus comprising:
- a first switching module coupled to the plurality of network data connections, the first switching module configured and arranged to monitor the incoming data messages for an error condition and in the event of an error condition being detected, to provide an error signal including indicia of the detected error condition;
- a control word module coupled to the phase locked loop of each of the plurality of network devices to monitor a control word providing indicia of the input data rate of the plurality of data messages received by the corresponding network device and the control word module further coupled to the first switching module and the control word module configured and arranged to provide as an output the control word of one of the plurality of network devices identified as receiving a network data connection identified as having an error condition;
- a protection device including an error data generator and an error data rate generator, the error data rate generator coupled to the control word module, the error data rate generator configured and arranged to receive the control word and to provide a data carrier signal for to provide a data rate substantially equal to the PLL recovered data rate of the corresponding network device, the error data generator coupled to the first switching module and being responsive to the error signal by generating error data, wherein the error data generator in conjunction with the error data rate generator provide as an output, the plurality of predetermined error data at substantially the PLL recovered data rate;
- the protection device further including a protection device framer, pointer interpreter, a mapper and PLL coupled to the error data rate generator, wherein in the event that an error condition has been detected, the first switching module is configured and arranged to provide the plurality of data messages carried on the identified data network connection to the protection device framer for processing, wherein the protection device framer receiving the plurality of data messages and providing gapped data to the protection device pointer interpreter that provides gapped data to the protection device PLL that provides an output of ungapped data at the network device PLL recovered data rate;

the plurality of predetermined error data at substantially the PLL recovered data rate provided to the network device to be appropriately inserted into the plurality of data messages.

21. The apparatus of claim 20 wherein the error condition detected by the first switching module is a loss of signal error.

22. The apparatus of claim 20 wherein the error condition detected by the first switching module is a loss of clock signal error.

23. The apparatus of claim 20 wherein the error condition detected by the first switching module is a loss of frame signal error.

24. The apparatus of claim 20 wherein the error condition detected by the first switching module are the portion of the data providing indicia of the existence of an error condition.

25. The apparatus of claim 24 wherein the portion of the data providing indicia of the existence of an error condition indicates an AIS error has occurred upstream in the data network.

26. The apparatus of claim 20 wherein the control word is a previously stored control word.

27. A method of maintaining a data rate in a network device receiving at least one network data connection, the network device including a trainer, a pointer interpreter, a demapper, and a phase locked loop (PLL), the PLL providing a PLL control word indicative of a recovered data rate of the PLL, the network data connection carrying data signals including a plurality of data messages having a first format, the first format including a portion of the data providing indicia of the existence of an error condition, the plurality of data messages having an input data rate, the method comprising the steps of:

receiving an input data signal from the network data connection;

recovering a first data rate of the input data signal by the PLL;

in response to recovering the first data rate, providing a PLL control word indicative of the recovered first data rate by the PLL;

detecting an error condition in the input data signal by a monitor;

in response to the detected error condition, providing an error signal as an output by the monitor;

receiving the PLL control word by an error data rate generator;

in response to receiving the PLL control word, generating an AIS data rate signal substantially equal to the first data rate by the error data rate generator; and in response to the error signal, generating a predetermined AIS characteristic data sequence at the AIS data rate by an error data generator, the AIS characteristic data having a data rate substantially equivalent to the first data rate.

28. The method of claim 27 wherein the error condition detected by the monitor is a loss of signal error.

29. The method of claim 27 wherein the error condition detected by the monitor is a loss of clock signal error.

30. The method of claim 27 wherein the error condition detected by the monitor is a loss of frame signal error.

31. The method of claim 27 wherein the error condition detected by the monitor are the portion of the data providing indicia of the existence of an error condition.

32. The method of claim 31 wherein the portion of the data providing indicia of the existence of an error condition indicates an AIS error has occurred upstream in the data network.

* * * * *

UNITED STATES PATENT AND TRADEMARK OFFICE
CERTIFICATE OF CORRECTION

PATENT NO. : 6,999,480 B2  Page 1 of 1
APPLICATION NO. : 09/994460
DATED : February 14, 2006
INVENTOR(S) : Ravi Subrahmanyan et al.

It is certified that error appears in the above-identified patent and that said Letters Patent is hereby corrected as shown below:

Column 1, line 65, "Characteristic Synchronous" should read --Characteristics of Synchronous--;

Column 11, claim 13, line 31, "nodule" should read --module--; and

Column 13, claim 27, line 34, "trainer," should read --framer,--.

Signed and Sealed this

Twenty-eighth Day of November, 2006

JON W. DUDAS
*Director of the United States Patent and Trademark Office*